US005621887A

United States Patent [19]
Chatterji

[11] Patent Number: 5,621,887
[45] Date of Patent: Apr. 15, 1997

[54] FAULT TOLERANT DISK MANAGEMENT SYSTEM WHICH TESTS FAILED DISKS DURING VARIED TIME INTERVALS WHICH ARE BASED UPON THE CRITICALITY ASSOCIATED WITH THE FAILED DISKS

[75] Inventor: Sanjoy Chatterji, Waltham, Mass.

[73] Assignee: Sequoia Systems, Inc., Marlboro, Mass.

[21] Appl. No.: 44,303

[22] Filed: Apr. 7, 1993

[51] Int. Cl.$^6$ ................................................. G06F 11/00
[52] U.S. Cl. ......................... 395/183.18; 395/182.21; 395/185.08
[58] Field of Search ................... 395/575, 182.03, 395/182.04, 182.05, 183.18, 185.08, 489, 182.21; 371/10.1, 10.2, 62, 16.3, 10.3; 364/270.3

[56] References Cited

U.S. PATENT DOCUMENTS

| | | | |
|---|---|---|---|
| 4,982,404 | 1/1991 | Hartman | 371/16.3 |
| 5,012,435 | 4/1991 | Bailey et al. | 371/16.3 |
| 5,155,845 | 10/1992 | Beal et al. | 371/10.1 |
| 5,159,671 | 10/1992 | Iueimi | 371/10.1 |
| 5,202,887 | 4/1993 | Ueno et al. | 371/10.1 |
| 5,210,866 | 5/1993 | Milligan et al. | 395/575 |
| 5,212,784 | 5/1993 | Sparks | 371/10.1 |
| 5,249,288 | 9/1993 | Ippolito et al. | 395/575 |
| 5,287,363 | 2/1994 | Wolf et al. | 371/62 |
| 5,327,550 | 7/1994 | Pribnow | 371/10.2 |
| 5,357,509 | 10/1994 | Ohizumi | 371/10.1 |
| 5,367,669 | 11/1994 | Holland et al. | 371/10.1 |
| 5,392,244 | 2/1995 | Jacobsen et al. | 371/10.1 |

*Primary Examiner*—Robert W. Beausoliel, Jr.
*Assistant Examiner*—Joseph E. Palys
*Attorney, Agent, or Firm*—Wolf, Greenfield & Sacks, P.C.

[57] ABSTRACT

A fault tolerant disk management system supports compound disks which are mirrored, so as to tolerate single point faults in any one physical disk of the compound disk. The system further minimizes the exposure of data stored on such a compound disk arising from additional single point failures in other physical disks of the compound disk. The system may be implemented as a software method for removing a physical disk from a logical compound disk without breaking up the compound disk or any mirror of which the compound disk may be a part. The removed physical disk may then be reinserted into the compound disk and mirror after repair. Further, the system provides fault responses which may be varied in accordance with an indication of criticality of each disk to the system.

1 Claim, 7 Drawing Sheets

FAULT TOLERANT DISK MANAGEMENT SYSTEM WHICH TESTS FAILED DISKS DURING VARIED TIME INTERVALS WHICH ARE BASED UPON THE CRITICALITY ASSOCIATED WITH THE FAILED DISKS

BACKGROUND

1. Field of the Invention

The present invention relates generally to computer systems for controlling data storage devices, and more specifically to computer systems used in fault tolerant computers, which select recovery strategies and which permit replacement of a defective data storage device with a functioning data storage device.

2. Description of the Prior Art

Fault tolerant computers are a class of computer designed to have a very high level of availability. Computers having extremely high levels of availability are particularly required for certain transaction processing applications. For example, in the banking industry, in the airline reservation industry and in financial market places, it is essential that transaction processing computers be continuously available and not lose any transactions or data.

Many parts of a transaction processing system have successfully been made extremely fault tolerant. This may be accomplished by incorporating various kinds of redundancy and fault detection within the components which comprise the transaction processing system. Several important parts of a transaction processing system including operating system software, customer application software and customer data are stored in large data storage devices, for example disk drives. However, achieving fault tolerance in data storage devices has proved difficult, because these devices present special fault tolerance problems.

A data storage subsystem, of which a data storage device may be a part, may be made fault tolerant by employing redundant data storage devices, so as to prevent data loss and system unavailability in the event that any single data storage device becomes unavailable. One technique which uses redundant data storage devices to achieve fault tolerance is called mirroring.

In a mirroring system, each logical or physical data storage device is paired with another logical or physical data storage device of the same capacity. The combination is known as a mirror pair. The mirror pair is a logical device which may be addressed by a user and behaves as a single storage device. Any action performed on the logical mirror pair which modifies the contents of the mirror pair is simultaneously performed on—i.e., mirrored on—both data storage devices comprising the mirror pair. Thus, when such a system functions normally, identical, duplicate data is stored on both data storage devices of the mirror pair. When a mirror pair exhibits normal operation as described above, it is said to be synchronized.

When one data storage device of a mirror pair fails, that failure may be detected and the mirror pair is said to lose synchronization. The failure of a single device within a system is known as a single-point failure. Multi-point failures would involve substantially simultaneous failure of more than one device of a system. However, in the case of this single-point failure, the other data storage device of the mirror pair may be used to maintain the function of the mirror pair until the failed data storage device has been repaired or replaced. During the period when the mirror is out of synchronization, the data storage subsystem is no longer tolerant of an additional single-point failure, assuming there is no additional redundancy, because an additional single-point failure turns the total failure scenario into a multi-point failure which requires multiple redundancy.

Some transaction processing systems include very large databases or very large sets of files which are preferably grouped together on a single large data storage device. Sometimes, a single data storage device of suitable size is not available. Then it may be desirable to create another logical device in the system, known as a compound logical data storage device. System software may permit the logical construction of a compound data storage device comprising several smaller data storage devices that will be referred to together as a single logical device, having a single designation, as with the logical mirror pair described above. For example, suppose a three-gigabyte, mirrored disk drive is the desired data storage device, as shown in FIG. 1. However, in this example, no three-gigabyte physical disks are available. Then three one-gigabyte physical disks may be grouped together as one logical device called a compound disk 101. In order to mirror such a compound disk, it is necessary to mirror 102 it with a compound disk 103 having the same storage capacity. Thus, a three-gigabyte compound mirrored pair 105 may comprise six one-gigabyte disks 107, 109, 111, 113, 115 and 117.

When any one physical disk (FIG. 2, 115) of a compound disk (FIG. 2, 103) fails and must be repaired or replaced, the mirror (FIG. 2, 102) for the entire mirrored compound disk (FIG. 2, 105) loses synchronization (FIG. 3, step 301), because each compound disk (FIG. 2, 101 and 103) is treated as a single logical device. That is, there is a logical device table maintained by the operating system software which describes each logical device in the system and a physical device table maintained by the operating system software which describes each physical device in the system. When any physical device comprising a logical device fails, both the physical device in the physical device table and the corresponding logical device in the logical device table are shown in their corresponding tables to have failed. Thus, the mirror must be broken between compound disks (FIG. 2, 101 and 103) and the compound disk containing the failed physical disk must then be removed from the logical device table (FIG. 3, step 303), so as to allow the failed physical disk (FIG. 2, 115) to be separately accessed and perhaps removed from the physical device table so as to permit repair or replacement. A new compound disk, including the repaired or replaced physical disk may now be created and inserted into the logical device table (FIG. 3, step 307) and rebound with the working compound disk (FIG. 2, 101) for mirroring (FIG. 3, step 309). Since the mirror for the entire compound mirrored disk lost synchronization, all data on the working compound disk must then be copied to the new compound disk to synchronize the mirror (FIG. 3, step 311). Thus, in the event of a single physical disk failure a great deal of time is often wasted copying data from one entire compound disk, to the other. Furthermore, during the entire period of time between when the mirror for the entire compound disk loses synchronization (FIG. 3, step 301) and the time when all data has been copied to the new compound disk, thus synchronizing the new mirror (FIG. 3, step 33), the system is exposed to failure resulting from any additional single-point failure of a physical disk.

Therefore, it is a general aim of the present invention to improve the fault tolerance of data storage subsystems which may include compound logical data storage devices.

SUMMARY OF THE INVENTION

According to one aspect of the present invention, there is provided a method of managing faults in a compound mirrored disk having a plurality of first physical disks forming a first compound disk and a plurality of second physical disks forming a second compound disk, the first and second compound disks bound to each other as a mirror pair, in a data processing system including a physical device table describing each physical device in the system and a logical device table describing each logical device in the system, comprising the steps of:

identifying a failed physical disk from among the plurality of first physical disks and the plurality of second physical disks;

showing in the physical device table the failed physical disk as unavailable for access;

showing in the logical device table a one of the first and second compound disks including the failed physical disk as available for access;

replacing in the physical device table the failed physical disk with a working physical disk; and resynchronizing the mirror by copying data corresponding to data stored on the failed physical disk from a one of the first and second compound disks not including the working physical disk to the one of the first and second compound disks including the working physical disk.

According to another aspect of the present invention, in a computer system with an operating system and a disk system, there is provided a method of managing faults in the disk system including a plurality of logical disks which each have one of a plurality of criticalities associated therewith and stored in a logical device table descriptive of the plurality of disks, comprising the steps of:

identifying a failed logical disk from among the plurality of logical disks;

determining a criticality associated with the failed logical disk by reading the logical device table;

initiating a time out having a predetermined interval associated with each of the plurality of criticalities;

retesting the failed logical disk during the time out interval to determine if the failed logical disk has returned to a non-failed state; and reinitializing the operating system upon expiration of the time out interval.

BRIEF DESCRIPTION OF THE DRAWING

In the drawing, wherein similar reference designations have been used to indicate similar elements.

DETAILED DESCRIPTION

Figure 1:
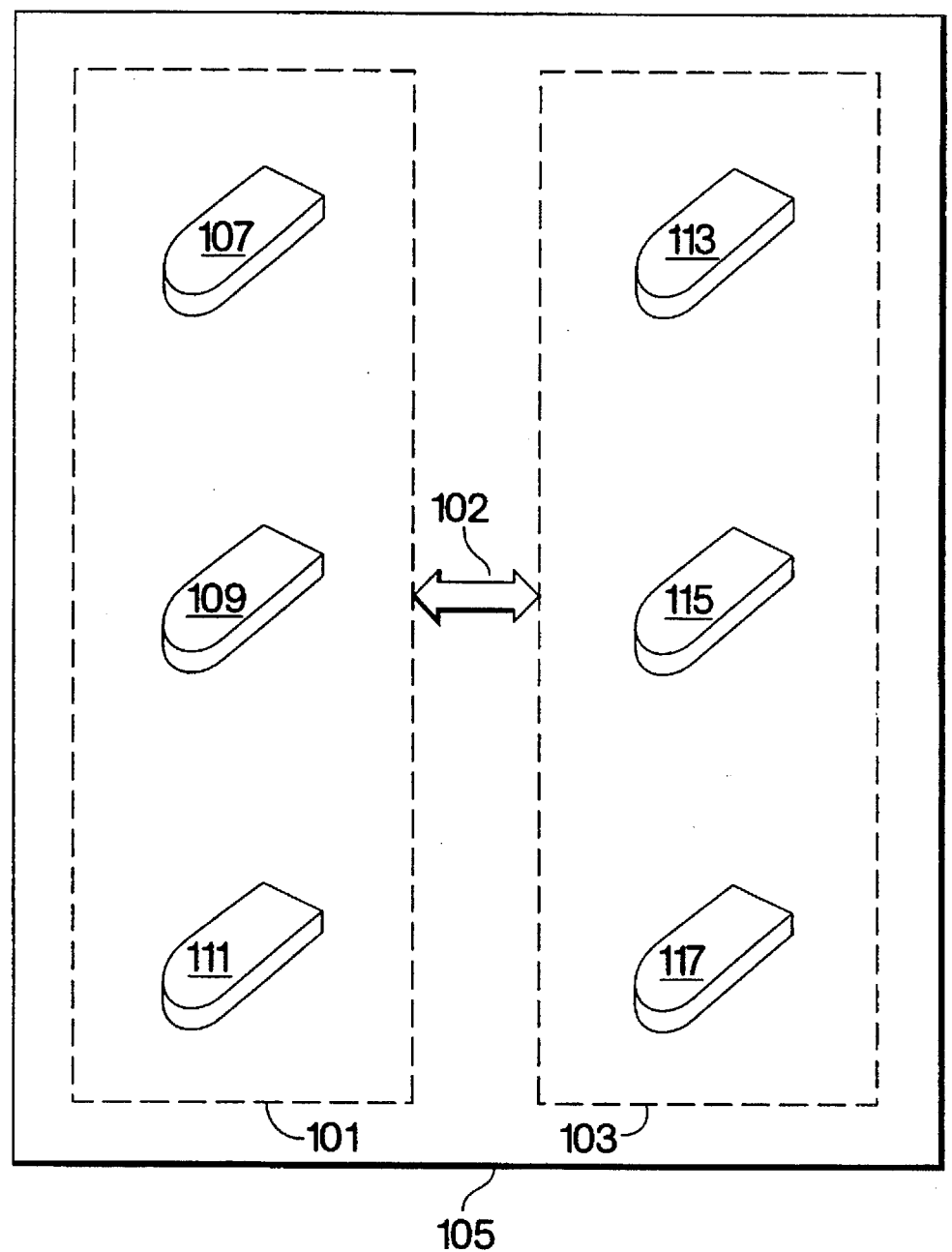
FIG. 1 is a block diagram representing a mirrored compound disk of the prior art.

The present invention will be better understood by reading the following description in conjunction with the drawing.

Figure 4:
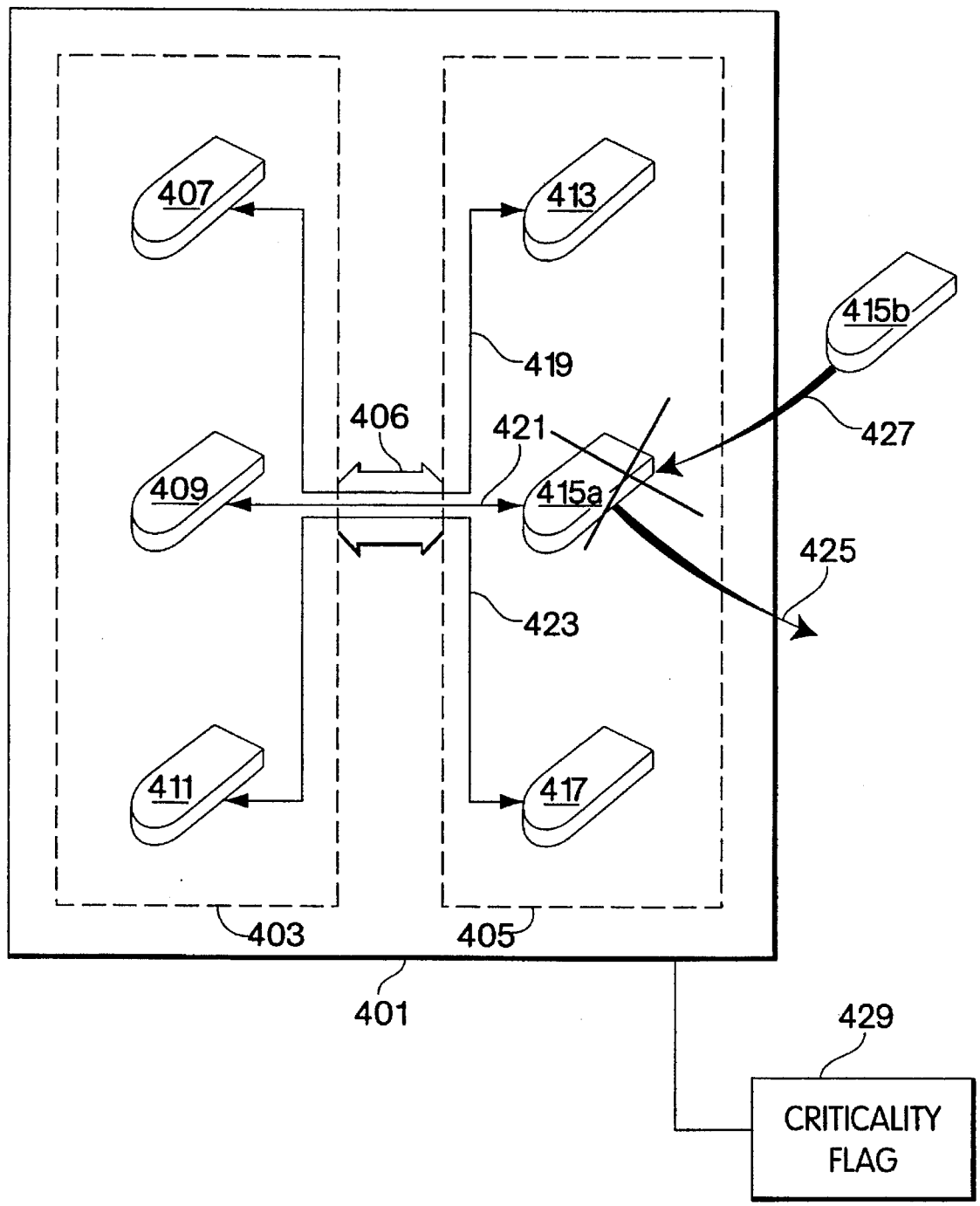
FIG. 4 is a block diagram representing the effect of a physical disk failure on a mirrored compound disk of the present invention.

A mirrored compound disk according to the present invention is shown in FIG. 4. Mirrored compound disk 401 is addressed by a user as a single, logical device. That is, when a user gives instructions to read data from or write data to such a compound disk, the user does not specify on which physical disk the operation will be performed. Logically, the mirrored compound disk 401 is treated by a user as though it were a single, large, physical disk.

Figure 7:
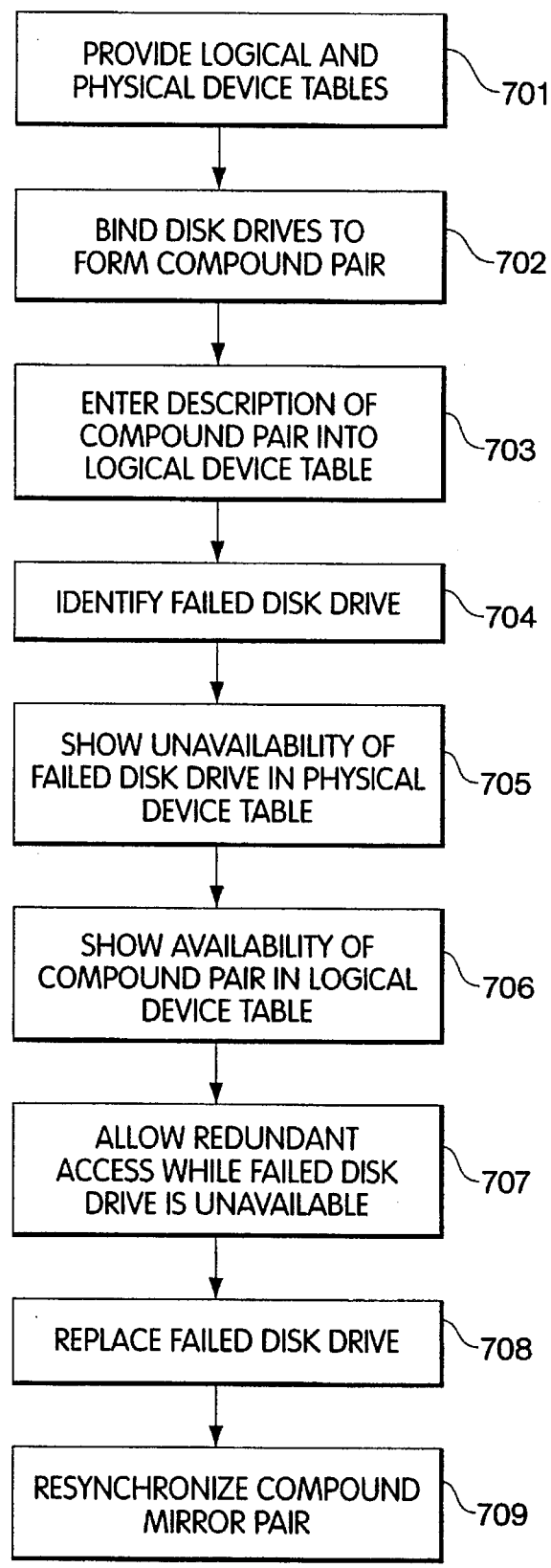
FIG. 7 is a flowchart of a process in a accordance with an embodiment of the invention.

The mirrored compound disk actually comprises two compound disks 403 and 405 of equal storage capacity, which are bound to form a mirror pair 406 (FIG. 7, Step 702). Further, each compound disk 403 and comprises a number of physical disks. Compound disk 403 comprises physical disks 407, 409 and 411. Compound disk 405 comprises physical disks 413, 415a and 417. Note that physical disk 415a has been lined out, denoting a failure of physical disk 415a. This will be discussed below.

In accordance with one aspect of the present invention, mirror pair 406 is formed as follows: the storage space of each physical disk comprising compound disk 403 has a one-to-one correspondence with the storage space within compound disk 405, even though the physical disks 407, 409, 411, 413, 415a and 417 do not necessarily have a one-to-one correspondence in their storage capacities. Indeed, all that is required is that the storage capacities of compound disks 403 and 405 correspond; each physical disk contributing to the storage capacity of a compound disk may contribute any portion of that physical disk's storage capacity—the entire physical disk need not be used for that compound disk. When a user requests a write operation to mirrored compound disk 401, the mirroring software then generates two write operations, one to each of compound disks 403 and 405. Software which manages compound devices then calculates to which physical disk of each compound disk 403 and 405 the writes are directed.

In the example shown in FIG. 4, the physical disks are assumed to be of equal storage capacity and have a simple one-to-one correspondence, as shown by mappings 419, 421 and 423. Thus, a write operation to data stored in the middle third of mirrored compound disk 401 would cause data to be written to both of physical disks 409 and 415a.

When more than one user at one time attempts to read from mirrored compound disk 401, a performance improvement over unmirrored and non-compound devices is seen. This is because up to two users may simultaneously access the storage space contained in each mirror pair—one for each physical device. Although this is also a characteristic of prior mirrored compound disks, the present invention maintains some portion of this performance improvement even during failure of a physical disk, of which the prior art was incapable. This is discussed below.

As noted above, in FIG. 4 physical disk 415a has failed. In contrast with the prior art system described above, this failure of one physical disk of mirrored compound disk 401 does not result in either the mirror 406 losing synchronization completely or compound disk 405 having to be removed from the logical device table.

In accordance with one aspect of the present invention, mirrored compound disk 401 merely has a "hole" in the mirror. Compound disk 405 merely has a "hole" in the storage space, where data stored on physical disk 415a belongs. The hole in the storage space of compound disk 405 results in the hole in the mirror, while permitting mirroring to continue around that hole, as follows.

Physical disks 407, 413, 411 and 417 continue to provide mirroring for that storage space not corresponding to the storage space of physical disk 415a (FIG. 7, Step 707). However, physical disk 409 operates as an unmirrored disk, because in this example it corresponds to the storage space of physical disk 415a. Mirrored compound disk 401 continues to be available to users. It retains its fault tolerant characteristics with respect to physical disks 407 and 413 (whose storage space happens to correspond in this example) and of physical disks 411 and 417 (whose storage space also happens to correspond in this example), but is not tolerant of faults in physical disk 409. However, these changes are not perceptible to the user, who continues to address the single mirrored compound disk 401.

Figure 2:
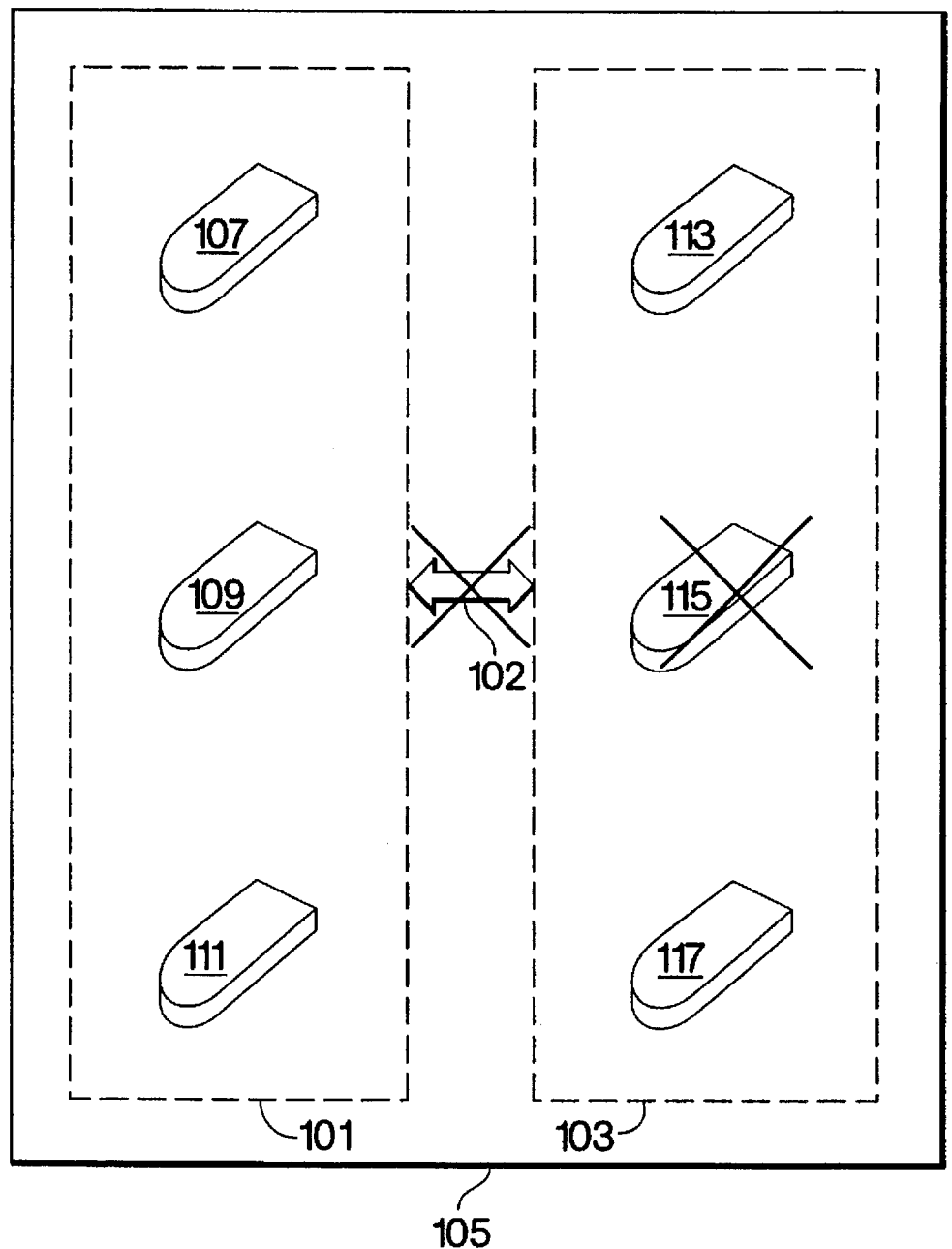
FIG. 2 is a block diagram representing the effect of a failed physical disk on the mirrored compound disk of FIG. 1.
Figure 3:
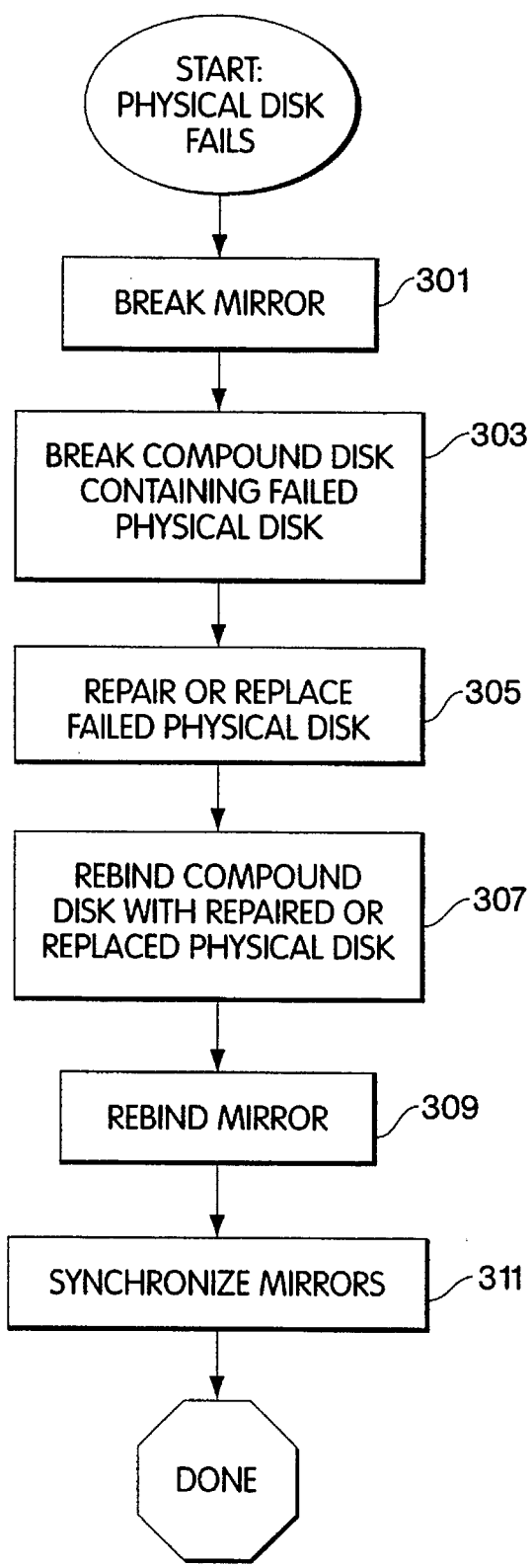
FIG. 3 is a flow chart of the fault tolerant disk management process of the prior art.

The simultaneous read access discussed above continues to be available, with one exception. Only one user may read that data from mirrored compound disk 401 which happens to be stored on physical disk 409. This is due, of course to physical disk 415a having failed and therefore physical disk 409 corresponds 421 to unavailable storage space. Recall that in the prior art of FIGS. 1–3 only one compound disk remained operative during this type of failure, because the entire compound disk would be shown in the logical device table as having failed. Thus, in the prior art, the performance enhancement due to mirroring was lost. In accordance with this aspect of the present invention, some of the performance enhancement due to mirroring may be maintained, because only the failed physical disk 415a is shown only in the physical device table as having failed, but the compound disk 405 continues to be shown in the logical device table as available.

Failed physical disk 415a may now, for example, be physically removed 425 for repair or replacement as required. As shown in FIG. 4, a new physical disk 415b may be substituted 427 for failed physical disk 415a. The system software then plugs the hole in compound disk 405 by inserting physical disk 415b into the logical device table description of compound disk 405, thus covering with physical disk 415b the storage space for data formerly held on physical disk 415a. Since compound disk 405 continued to exist during this process, merely maintaining empty storage space where physical disk 415a should have been and further maintaining mirroring of the unaffected corresponding storage spaces 419 and 423 in compound disk 405 and compound disk 403, only data corresponding 421 to newly inserted physical disk 415b need be copied in order to complete synchronization of mirror. Thus, the hole in the mirror is plugged in this example by copying data from physical drive 409 of compound disk 403 to physical drive 415b of compound disk 405. Once copying is complete, mirror pair 406 has been resynchronized.

Figure 5:
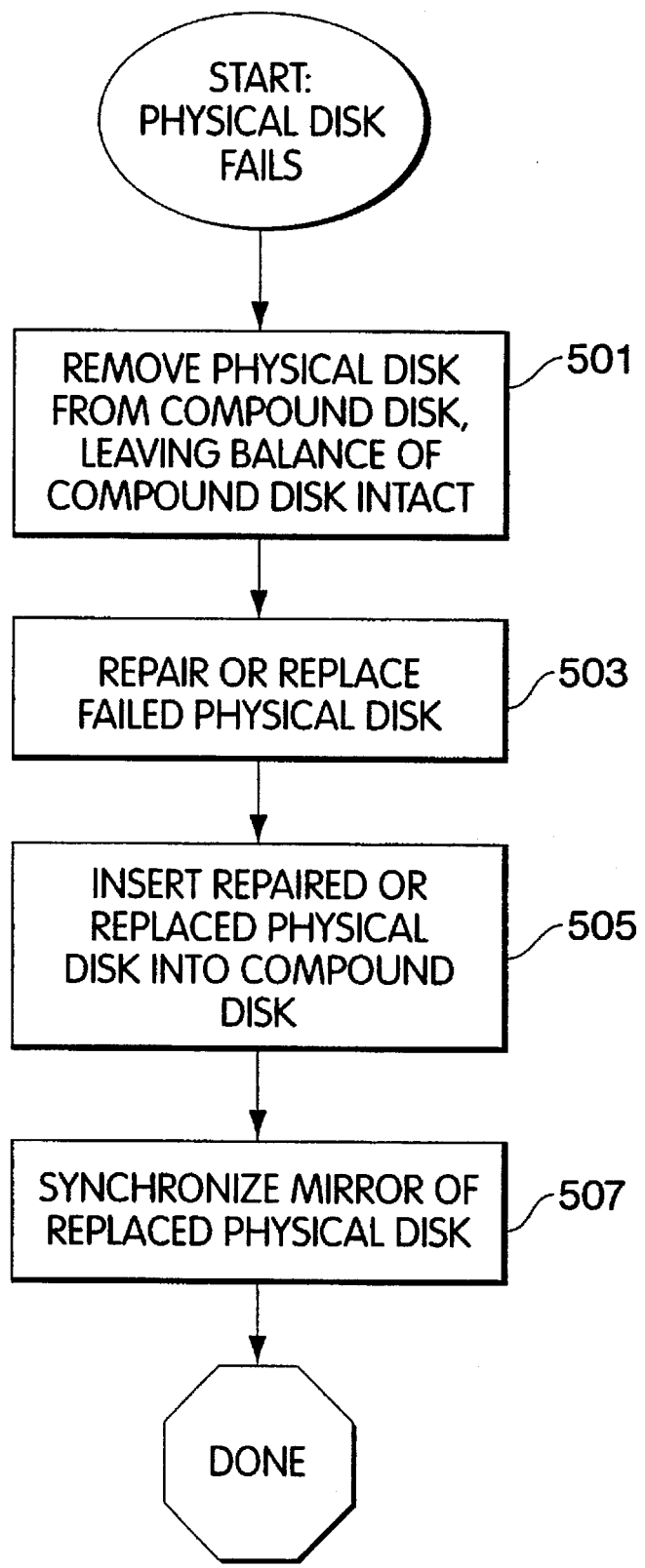
FIG. 5 is a flow chart of the fault tolerant disk management process of the present invention.
Figure 6:
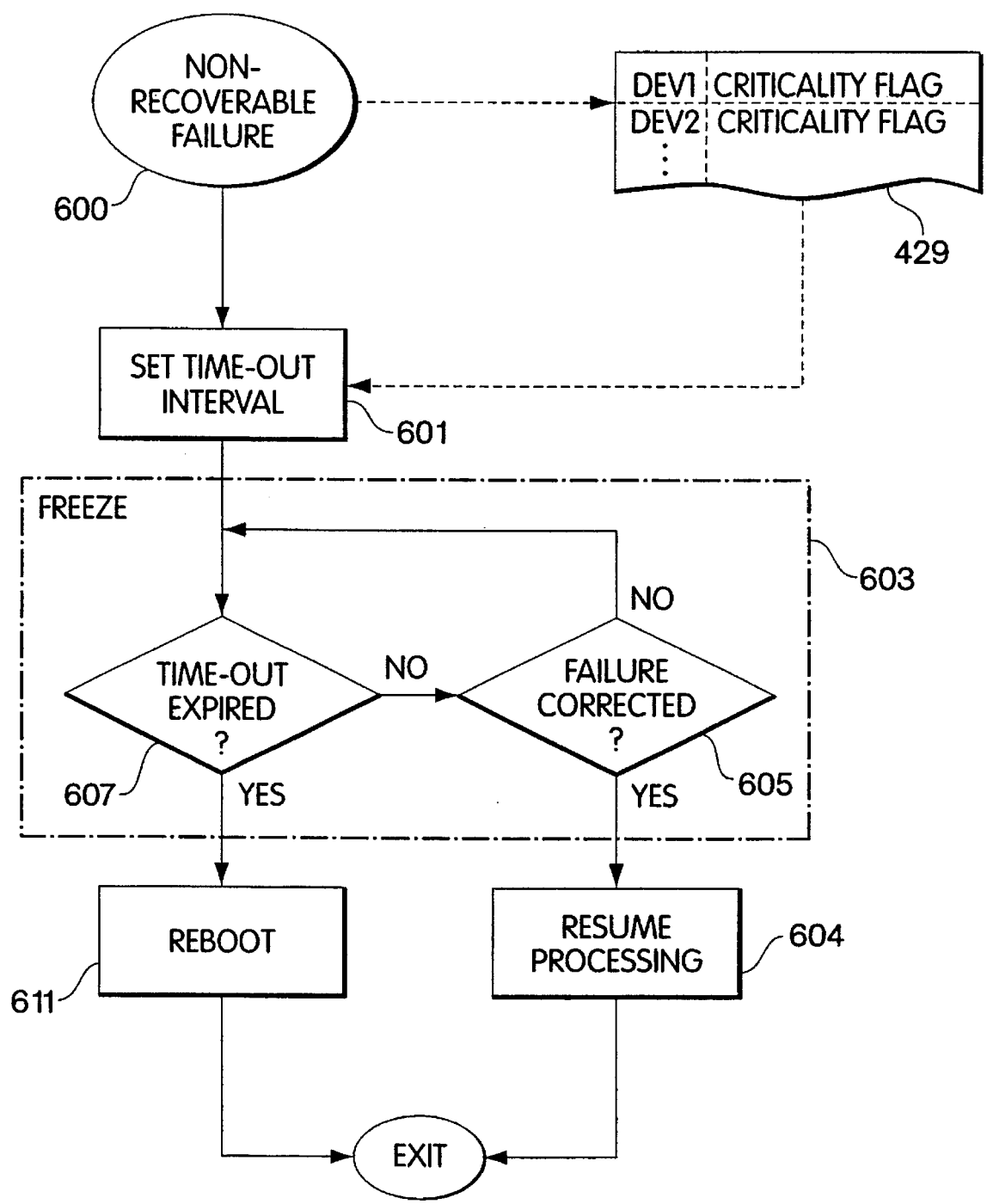
FIG. 6 is a flowchart of the system response to a non-recoverable failure in accordance with a criticality flag.

The steps of the process described above are conveniently represented by the flow chart of FIGS. 5 and 7. As shown in FIG. 7, as in the prior art, a physical device table and logical device table may be provided (Step 701). After failure of a physical disk (Step 704) included as part of a mirrored compound disk which may be described in logical device table (Step 703), the failed physical disk is shown in the physical device table as unavailable for access (Step 705), although continuing to be shown in the logical device table as part of the compound disk (Step 501, 706). Next, the failed physical disk may be either repaired or replaced (Step 503) at an operator's discretion. During this step, software for managing compound devices recognizes that writes to such a failed physical disk are to be simply omitted. After repair or replacement of the failed physical disk, a working physical disk is then inserted into the physical device table, replacing therein the failed physical disk (Step 505, 708). Finally, data from storage space corresponding to the newly inserted physical disk is copied over to the newly inserted physical disk (Step 507), so as to synchronize the mirror (Step 709), thus plugging the hole in the mirror.

Two results of the method of the present invention just described improve fault tolerant disk performance over that of the prior art. Firstly, in accordance with the present invention, the quantity of data by which the system is exposed to failure due to a single-point fault is reduced to only the quantity of data contained on the single failed physical disk. Secondly, the method of the present invention employs fewer steps than the prior art to achieve the first result. Therefore, the total time of exposure to failure due to a single-point fault is reduced.

In accordance with another aspect of the present invention, fault tolerance of data storage sub-systems may be further enhanced. This feature, known as critical disk management, may permit a system operator to correct a catastrophic or multi-point failure which threatens to overwhelm other fault tolerant measures then being employed.

In accordance with this aspect of the present invention, the logical device table further includes a criticality flag 429. The contents of the criticality flag indicates a degree of criticality of the particular logical device to system operation. In the embodiment described, for example, each device may be identified as system critical, as application critical or as not critical.

A system critical device is one whose catastrophic failure would result in an operating system crash. Therefore, a device may be designated as system critical if it holds files containing the system virtual memory (i.e. system swap space), for example.

An application critical device is one whose loss would cause an imminent failure of primary application software running on the system. For example, in a transaction processing system, a device holding the transaction handling routines would probably be identified as application critical. However, a device holding only a word processing program may not be identified as application critical.

The default criticality of each device, if one of the above two designations is not specified, is not critical. For example, in a transaction processing system as described above, the device holding the word processing software would likely be not critical, because the primary mission of that system is not affected by loss of that application software.

When a logical device sustains a non-recoverable failure 600, the response of the operating system to that failure will vary in accordance with the criticality flag 429 for that device. Each criticality level is associated with a critical device time out interval 601. Before expiration of the time out interval corresponding to the criticality of the failed device, the system enters a "freeze" condition 603, wherein it executes a tight loop, retesting the failure condition 605 and awaiting the expiration of the time out interval 607. If the failure is corrected before expiration of the time out interval, then processing resumes 609. Upon expiration of the time out interval, when the failure has not been corrected, the system attempts to reinitialize and reload all system software, commonly known as rebooting 611. The time out interval affords a system operator enough time to take mechanical interventions which may correct the failure. Correcting the failure within the time out interval, of course prevents a system outage which would otherwise occur when the system reboots.

Typical time out intervals may be set as follows. All system critical devices may be set to time out after sixty seconds. This gives a system operator a relatively short period in which to correct a failure. The time out interval for application critical devices may be set for sixty minutes. Since the operating system itself is not directly affected by failure of an application critical device, it may be helpful to give a system operator more time to replace the failed device without forcing a complete system reinitialization. Finally, non-critical devices are typically set to have no timeout interval, and are treated specially as described now. That is, the system does not enter the "freeze" condition when a non-critical device fails, but merely continues to operate while the non-critical device is taken off line.

Combining the critical device aspect of the present invention with the mirrored compound disk aspect of the present invention provides total fault tolerant disk management. Non-catastrophic single-point failures are effectively handled through the mirroring described above, while catastrophic or multi-point failures may be managed using the critical disk aspect just described. When a multi-point failure which has occurred is later reduced to a single-point failure by manual corrective measures, mirroring may permit the system to become operative again, as described above in connection with mirrored compound disks.

Extensions and variations contemplated by this invention will now be apparent to those skilled in the art. They may include extensions for use in storage sub-systems other than disk drives, for example. A device or a physical disk, as described above may in that case be taken to refer to other electro-mechanical or electrical storage devices. Although the above description was given in the contexts of large transaction processing systems and general fault tolerant systems, this invention may be practiced in any storage system wherein the advantages of the invention may be desired, for example in personal computers, mini-computers or other systems employing storage devices. Additional modifications, alterations and improvements are intended to be suggested hereby and are within the spirit and scope of the invention. Accordingly, the invention is limited only by the following claims and equivalents thereto.

What is claimed is:

1. In a computer system with an operating system and a disk system, a method of managing faults in the disk system including a plurality of logical disks which each have one of a plurality of criticalities associated therewith and stored in a logical device table descriptive of the plurality of disks, comprising the steps of:

identifying the failed logical disk from among the plurality of logical disks;

determining a criticality associated with the failed logical disk by reading the logical device table;

initiating a time out having a predetermined interval selected from a plurality of intervals based upon the criticality associated with the failed logical disk, each of the plurality of intervals being associated with a corresponding at least one of the plurality of criticalities;

retesting the failed logical disk during the time out interval to determined if the failed logical disk has returned to a non-failed state; and reinitializing the operating system upon expiration of the time out interval.

* * * * *